(12) United States Patent
Namuduri et al.

(10) Patent No.: US 10,008,342 B2
(45) Date of Patent: Jun. 26, 2018

(54) METHOD AND APPARATUS FOR SUPPLYING REGULATED ELECTRIC POWER

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US); Nicholas W. Pinto, Shelby Township, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/056,474

(22) Filed: Feb. 29, 2016

(65) Prior Publication Data

US 2018/0038356 A1 Feb. 8, 2018

(51) Int. Cl.
| | | |
|---|---|---|
| *B23K 11/24* | (2006.01) | |
| *H01H 3/22* | (2006.01) | |
| *F03G 7/06* | (2006.01) | |
| *E05B 47/00* | (2006.01) | |
| *H02M 7/217* | (2006.01) | |
| *G05F 1/56* | (2006.01) | |
| *H02M 1/00* | (2006.01) | |

(52) U.S. Cl.
CPC .......... *H01H 3/22* (2013.01); *E05B 47/0001* (2013.01); *F03G 7/065* (2013.01); *G05F 1/56* (2013.01); *H02M 7/217* (2013.01); *E05B 47/0009* (2013.01); *H02M 2001/007* (2013.01); *H02M 2001/0016* (2013.01); *H02M 2001/0045* (2013.01)

(58) Field of Classification Search
CPC ........ F03G 7/065; E05B 47/0001; G05F 1/56; H01H 3/22; H02M 7/217
See application file for complete search history.

(56) References Cited

U.S. PATENT DOCUMENTS

2013/0162056 A1\* 6/2013 Pinto, IV ............... H01H 85/00
307/326

OTHER PUBLICATIONS http://www.linear.com/product/LTC4366, retrieval date Feb. 29, 2016.

\* cited by examiner

*Primary Examiner* — Daniel Cavallari
(74) *Attorney, Agent, or Firm* — Quinn IP Law

(57) ABSTRACT

A device for supplying electric power includes a rectifier, an adaptive voltage clamping circuit, and a DC-DC voltage regulator. The rectifier receives electrical power, and is electrically connected to an input line of the adaptive voltage clamping circuit. The adaptive voltage clamping circuit includes a power transistor, a voltage feedback circuit, and a controller. The DC-DC voltage regulator is electrically connected to the adaptive voltage clamping circuit and, in one embodiment an actuator. The controller monitors the voltage feedback circuit and controls the power transistor to a fully open state to transfer electric power to the DC-DC voltage regulator when the voltage level supplied to the DC-DC voltage regulator is less than a threshold. The controller controls the power transistor in a linear state to regulate the voltage transferred to the DC-DC voltage regulator when the voltage level supplied to the DC-DC voltage regulator is greater than the threshold.

20 Claims, 2 Drawing Sheets

METHOD AND APPARATUS FOR SUPPLYING REGULATED ELECTRIC POWER

TECHNICAL FIELD

The present disclosure relates generally to electric circuits, including circuits for providing a stable voltage level, such as for activating a locking mechanism using a smart material.

BACKGROUND

Electrical devices such as breaker boxes, electrical control boxes, and battery systems employ a cover plate with a mechanical locking mechanism that is arranged to engage a power switch when locked and disengage the power switch when unlocked. A common safety feature for breaker boxes or control boxes is a mechanical locking mechanism that is engaged whenever a main power switch is turned on. In one embodiment, the power switch removes contacts from a power feed side, thus isolating or removing power from the load side of the switch and all the circuitry connected to the load side of the switch. The power switch serves a dual purpose, including removing power from the feed side and disengaging a mechanical lock that prevents access to the feed or load contacts when the power switch is disengaged. When the switch is opened and thus disengaged the mechanical lock is also disengaged allowing access to the contacts. Residual electric power in a breaker box may not be discharged when the power switch is turned off, with such residual power caused by secondary power feeds such as a separate electric power line, by a mis-wired system, or by a DC power line.

Transformable materials, such as shape memory alloys (SMAs) have one or more properties that can be changed in a controlled fashion by external stimuli, such as temperature, electric field, stress, magnetic field, or pH level. Common smart materials include piezoelectric materials, shape-memory alloys, shape-memory polymers, magnetostrictive materials, magnetic shape-memory alloys, pH-sensitive polymers, temperature-responsive polymers, and chromic materials.

A shape-memory alloy is a metal alloy that remembers a cold-forged shape. This shape may also be referred to as an original, initial, or permanent state. The alloy, if deformed from its original shape by an applied load will return to it, i.e., will exhibit a shape memory in response to being exposed to an input of heat or electric current. Shape-memory alloys may be commonly known by names including the following: SMA, smart metal, memory metal, memory alloy, muscle wire, and smart alloy.

Transformable materials are referred to herein mostly as smart materials for ease of description. Any use of the term "smart material" is not intended to limit the material to being a certain type of transformable material, and references herein to smart materials should be considered to include broader readings whereby the material can be a transformable material other than what might be considered as only a smart material.

SUMMARY

A device and method for supplying electric power is described, and includes a rectifier, an adaptive voltage clamping circuit, and a DC-DC voltage regulator. The rectifier is disposed to receive electrical power indicated by an input voltage level, and includes an output line that is electrically connected to an input line of the adaptive voltage clamping circuit. The adaptive voltage clamping circuit includes a power transistor, a voltage feedback circuit, and a controller. The DC-DC voltage regulator includes an input line that is electrically connected to an output line of the adaptive voltage clamping circuit and an output line that is electrically connected to the actuator for the smart material. The controller is disposed to monitor the voltage feedback circuit and control the power transistor, including controlling the power transistor to a fully open state to transfer electric power to the DC-DC voltage regulator when the voltage feedback circuit indicates that the voltage level supplied to the DC-DC voltage regulator is less than a threshold voltage level. The controller controls the power transistor in a linear state to regulate the voltage level of the electric power that is transferred to the DC-DC voltage regulator when the voltage feedback circuit indicates that the voltage level supplied to the DC-DC voltage regulator is greater than the threshold voltage level.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
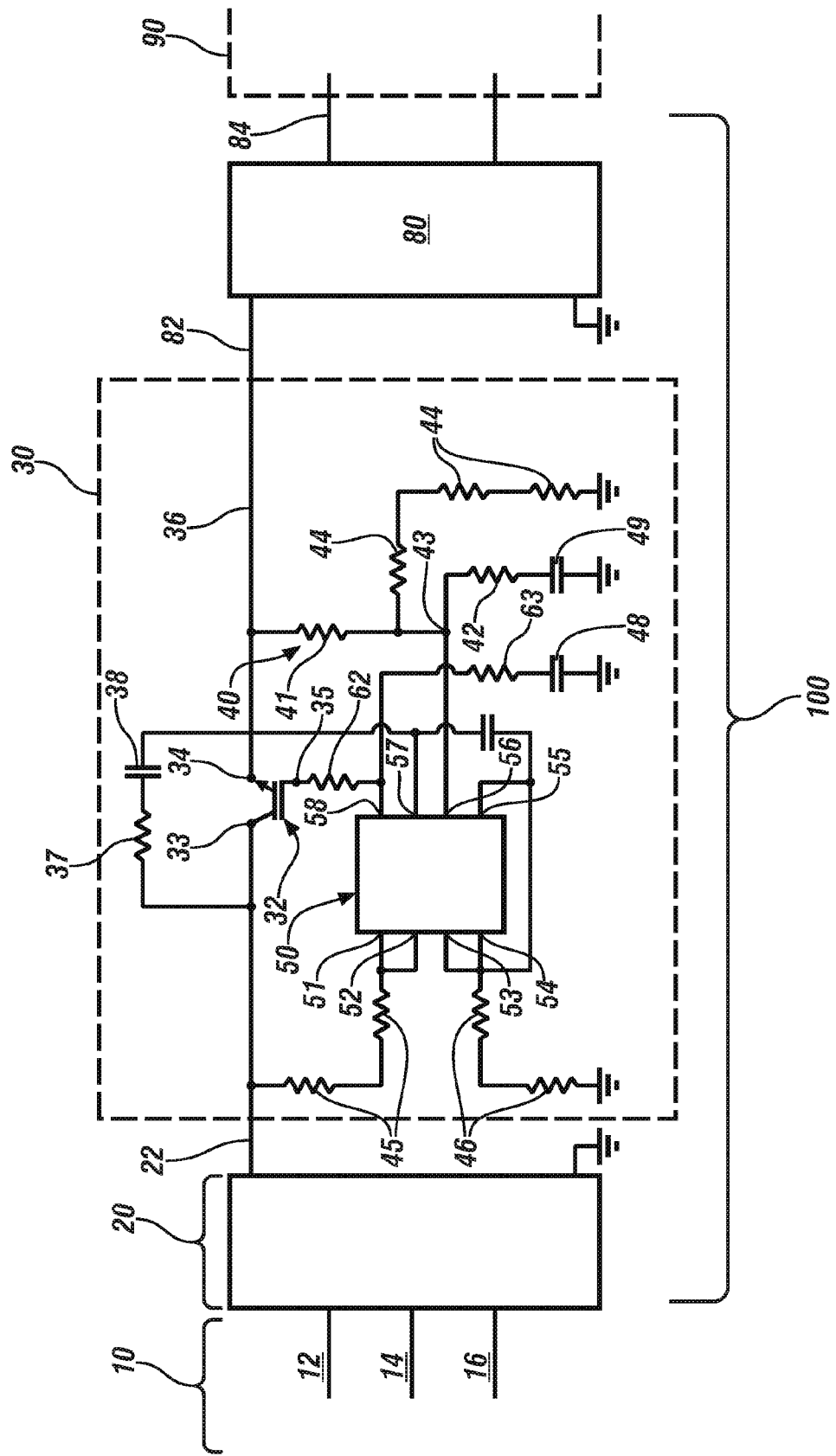
FIG. 1 schematically illustrates an electric power circuit for a smart actuator, including a rectifier that is electrically connected to an adaptive voltage clamping circuit that is electrically connected to a DC-DC voltage regulator, in accordance with the disclosure.

Referring now to the drawings, which are provided for the purpose of illustrating certain exemplary embodiments only and not for the purpose of limiting the same, FIG. 1 schematically illustrates an electric power circuit 100 including a rectifier 20 that is electrically connected to an adaptive voltage clamping circuit 30 that is electrically connected to a DC-DC voltage regulator 80. The rectifier 20 is disposed to receive electric power that is supplied from an electric power source 10, and the DC-DC voltage regulator 80 is disposed to supply regulated electric power to an actuator 90 via line 84. In one embodiment, and as described with reference to FIG. 2, the electric power circuit 100 may be advantageously applied to control activation and deactivation of a smart material actuator device that is implemented on an electrical power distribution box to control access thereto, including providing a lock-out capability. The electric power circuit 100 described herein accommodates a wide range of operation for the input voltage to the electrical distribution box while providing the lock-out capability. Like numerals refer to like elements in the Figures.

The electric power source 10 supplies electric power to the rectifier 20 via one or a plurality of input lines 12, 14, 16, wherein the electric power may be in the form of a single-phase alternating current (AC) input, a three-phase AC input, or a DC input. In one embodiment, the AC input may be a voltage level between 45 Vrms and 750 Vrms. In one embodiment, the DC input may originate from a DC power source, such as a battery, and may be a DC voltage level between 70 Vdc and 1000 Vdc. As appreciated by those skilled in the art, the electric power supplied by the electric power source 10 is dependent upon the application of the electric power circuit 100, which may include a manufacturing facility, a retail facility, a residential facility, an on-vehicle location, an off-grid facility, or any other facility or location wherein electric power is distributed, without limitation.

The rectifier 20 is an electrical device that includes one or a plurality of diodes to convert AC electric power to DC electric power, which is supplied via an input line 22 to the adaptive voltage clamping circuit 30. The diodes are selected to have voltage ratings and power ratings that are suitable for the input voltage from the electric power source 10. Multiple lower voltage diodes arranged in series may be employed. The rectifier 20 is preferably a full-wave rectification device, but may instead be a half-wave device in one embodiment. The rectifier 20 preferably incorporates a filter capacitor in parallel with a damping resistor of suitable voltage and power rating across the input line 22 and ground to minimize voltage ripple at the rectifier output. Rectifiers are known to those skilled in the art, and thus not described in detail herein.

The adaptive voltage clamping circuit 30 includes a power transistor 32 that is operatively connected to a controller 50, and a voltage feedback circuit 40. The power transistor 32 may be an insulated-gate bipolar transistor (IGBT) having a collector 33, emitter 34 and gate 35, wherein the collector 33 is electrically connected to the input line 22 of the rectifier 20, and the emitter 34 is electrically connected to an output line 36 that is electrically connected to an input line 82 of the DC-DC voltage regulator 80. Alternatively, the power transistor 32 may be any suitable controllable power switching device that may be operated in a linear mode, e.g., a field-effect transistor (FET). The power transistor 32 may have a voltage rating of 1200V in one embodiment and a linear mode power dissipation capability in excess of 50 W.

The power transistor 32 may be controlled to control electric power flow between the rectifier 20 and the DC-DC voltage regulator 80, as described herein. An RC circuit is arranged in parallel with the power transistor 32, and may include a resistor 37 in series with a capacitor 38, wherein the resistor 37 and capacitor 38 are suitably sized to filter transient electric noise.

The controller 50 is disposed to control a voltage drop across the power transistor 32. The controller 50 may be an integrated electronic circuit that is an over-voltage protection controller for protecting a device, e.g., the DC-DC voltage regulator 80, from voltage levels that are greater than a preferred voltage level. The voltage levels may include either a steady state voltage level or a transient voltage level. By way of example the controller 50 may be arranged to prevent a voltage level at the DC-DC voltage regulator 80 that is greater than a maximum input level. When the DC-DC voltage regulator 80 is a 360V/5V DC-DC voltage regulator, the controller 50 may be arranged to prevent a voltage level at the DC-DC voltage regulator 80 that is greater than a maximum input level of 360V DC. One example of an integrated electronic circuit that may operate as an over-voltage protection controller is LTC4366 High Voltage Surge Stopper, which is manufactured by Linear Technology Corporation, Milpitas, Calif. (USA).

The controller 50 may include a plurality of input pins, including a start-up supply pin 51, a second pin 52, a timer pin 53, a device return pin 54, a base pin 55, a feedback pin 56, an OUT pin 57 and a gate drive pin 58. The gate drive pin 58 electrically connects to the gate 35 of the transistor 32 via a charging circuit including resistors 62, 63 and gate capacitor 48. The input line 22 to the adaptive voltage clamping circuit 30 electrically connects via resistors 45 to the start-up supply pin 51 and preferably connects to the second pin 52. Resistors 45 may be a single device or a plurality of resistor devices, and may have a total resistance value in the order of magnitude of 2.4 M Ohms in one embodiment. The timer pin 53, device return pin 54, and base pin 55 are electrically connected, and are electrically connected via resistors 46 to an electrical ground. The resistors 46 may have a resistance value in the order of magnitude of 226K Ohms.

The voltage feedback circuit 40 may be a voltage divider circuit that electrically connects between the output line 36 of the adaptive voltage clamping circuit 30 that is electrically connected to the input line 82 of the DC-DC voltage regulator 80. The voltage feedback circuit 40 preferably includes a first resistor 41 connected in series with a second resistor 44 at a node 43, wherein the node 43 electrically connects to the feedback pin 56 of the controller 50. Other elements, e.g., resistors 42 and capacitor 49 may be employed for purposes of electrical noise suppression, etc., and are suitably sized.

In operation, the controller 50 functions as follows. The controller 50 monitors the voltage level presented at the feedback pin 56 and controls the power transistor 32 by controlling electric power from the gate drive pin 58 to the base 35 of the power transistor 32. The controller 50 controls the power transistor 32 to a fully ON state to transfer electric power to the DC-DC voltage regulator 80 when the voltage feedback circuit 40 indicates that the voltage level supplied to the DC-DC voltage regulator is less than a threshold voltage level. The controller 50 controls the power transistor 32 in a linear state to regulate the voltage level of the electric power that is transferred to the DC-DC voltage regulator 80 when the signal input from the voltage feedback circuit 40 to the feedback pin 56 indicates that the voltage level supplied to the DC-DC voltage regulator is greater than the threshold voltage level. The linear state of the power transistor 32 is selected to regulate the voltage level of the electric power that is transferred to the DC-DC voltage regulator 80 to the threshold voltage level.

During an initial power-up of the electric power circuit 100, the controller 50 controls in-rush current by gradually raising the voltage level at the gate drive pin 58 that controls the conduction of the power transistor 32. During this phase, a small bias current and the current required to charge the gate capacitor 48 are drawn from the rectifier output via the resistors 62, 63. Once the voltage at line 36 reaches sufficient level to supply the bias power for the controller 50, all bias power is drawn from the stabilized voltage at line 36.

The DC-DC voltage regulator 80 may be an electronic circuit device that converts an unregulated DC voltage source from a higher voltage level to a lower, regulated voltage level. In one embodiment, the DC-DC voltage regulator 80 converts unregulated DC voltage that may be as high as 360V to electric power that is at a regulated 5V DC supply at a maximum of one ampere of current using transformer isolated switching mode or pulse width modulation (PWM) control principles. Alternatively, the DC-DC voltage regulator 80 may supply electric power at a regulated 10V DC supply at a maximum of two amperes of current, or other suitable electric voltage and current levels. Switched mode DC-DC voltage regulators are known devices.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Figure 2:
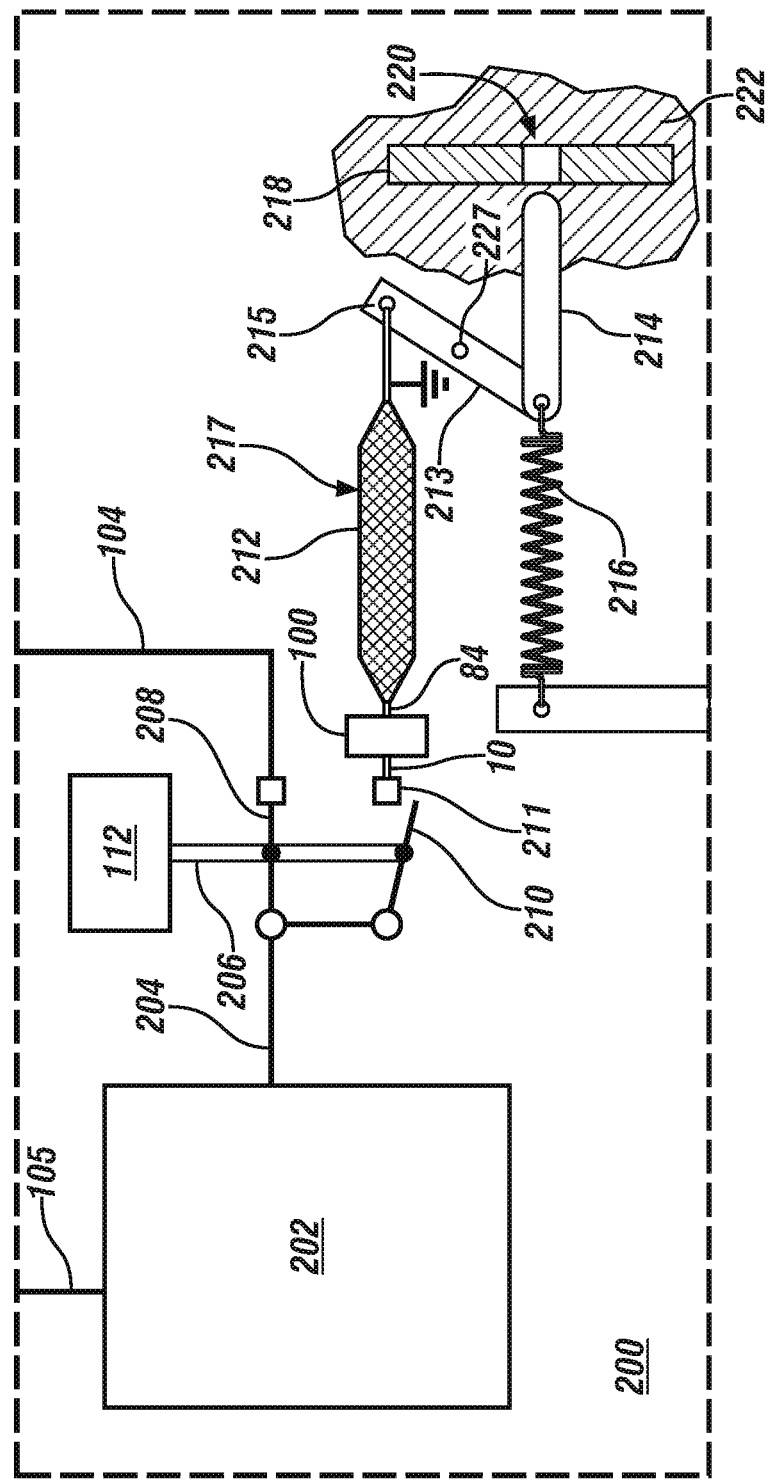
FIG. 2 schematically illustrates a block diagram of a system including a smart actuator in which the electric power circuit described with reference to FIG. 1 may be implemented, in accordance with the disclosure.

FIG. 2 schematically illustrates a block diagram of a system 200 in which the electric power circuit 100 described with reference to FIG. 1 may be advantageously implemented, wherein the electric power circuit 100 selectively supplies electric power to an SMA actuator 212 that is operatively connected to a mechanical latching system 217. In one embodiment, the SMA actuator 212 may be fabricated from a transformable material, such as a smart material. Exemplary smart materials may include, by way of a non-limiting example, a shape memory alloy, as described herein. The system 200 may be an apparatus such as an electrical power distribution box or a control box. The system 200 includes at least one system component 202 and power load 105 powered by electricity received from a power source 104, which may be a three-phase AC electric power input, a single-phase AC electric power input, or a DC electric power input. The system component(s) 202 can include any of a wide variety of electrical devices or parts, such as fuses, computing circuitry, capacitor banks (groups of capacitors grouped together to build a larger charge), electrical motor drives and brakes, temperature controls, and programmable logic controllers (PLCs).

The electrical line 204 connecting the power source 104 and the system component 202 is selectively openable and closable. As an example, in one embodiment, the connection can be opened and closed by way of an actuator 112, which may be a manually-operated power switch in one embodiment. With the actuator 112 in an ON position (as shown), a mechanical link 206 connected to the actuator 112 holds a first electrical switch 208 in a closed position, and correspondingly holds a second electrical switch 210 in an open position. The mechanical link 206 may include one or multiple parts. The first electrical switch 208 is connected between the system component 202 and the power source 104. With the first electrical switch 208 closed, current flows from the power source 104 to the system component 202. The second electrical switch 210 is connected between the component 202 and the SMA actuator 212. When the actuator 112 is in the ON position, the power source 104 is electrically connected through the first electrical switch 208 and line 204 to the system component 202 and the power load 105, and the electric power circuit 100 and SMA actuator 212 are electrically disconnected. When the actuator 112 is in an OFF position (not shown), the mechanical link 206 connected to the actuator 112 holds the first electrical switch 208 in an open position, and correspondingly holds the second electrical switch 210 in a closed position. Thus, the power source 104 is electrically disconnected from the system component 202 and the power load 105 and the electric power circuit 100 and SMA actuator 212 are electrically connected to the power load 105.

As described herein, the SMA actuator 212 is operatively connected to the mechanical latching system 217 that includes an intermediate link 213 and a locking mechanism 214. The locking mechanism 214 may be configured to engage a receptacle 220 when the SMA actuator 212 is activated by the electric power circuit 100, and the receptacle 220 may be coupled to a cover plate 222 that serves to prevent access to the electrical power distribution box when closed. The details of the mechanical latching system 217 described herein serve as one embodiment. The concepts described herein may be employed on a multitude of latch configurations.

The SMA actuator 212 extends between a first, fixed post 211 and a second, moveable post 215. The second post 215 is coupled to an intermediate link 213 at a first end of the intermediate link 213. A second, opposed end of the intermediate link 213 is coupled to a first end of a locking mechanism 214. The intermediate link 213 also includes a pivot point 227 that may be located in a middle portion thereof. The first end of the locking mechanism 214 may also couple to a biasing component 216 such as a tension spring.

As shown, the actuator 112 is in a first position, which holds the first electrical switch 208 in a closed position and the second electrical switch 210 in an open position. As such, electric power flows between the electric power line 204 and the system component 202, and no electric power is supplied to the SMA actuator 212. With no electric power supplied to the SMA actuator 212, it remains in a first, extended state, and the intermediate link 213 holds the locking mechanism 214 in a first position (as shown) such that a second end of the locking mechanism 214 is disengaged from a complementing part 218, such as a cover plate 222 or another securing component having a receptacle 220 for receiving the second end of the locking mechanism 214.

When the actuator 112 is in a second position, the first electrical switch 208 is in an open position and the second electrical switch 210 in a closed position. As such, no electric power flows between the electric power line 204 and the system component 202. However, any electric power that is present in the system component 202 or the power load 105 is supplied to the SMA actuator 212 at the fixed post 211 via the electric power circuit 100, which is electrically connected thereto. The presence of electric power supplied to the SMA actuator 212 causes it to transform to a second, retracted state, and the intermediate link 213 holds the locking mechanism 214 in a second position (not shown) such that the second end of the locking mechanism 214 is engaged with the complementing part 218, such as a plate or other securing component having a receptacle 220 for receiving the second end of the locking mechanism 214.

The SMA actuator 212 remains in the second, retracted state and locks the locking mechanism 214 to the complementing part 218 so long as there is sufficient electric power in the system component 202 to actuate the SMA actuator 212. The SMA actuator 212 returns to the first, extended state and unlocks the locking mechanism 214 to the complementing part 218 when the electric power in the system component 202 dissipates, thus permitting access to the system 200. The configuration of the SMA actuator 212, the locking mechanism 214, and the intermediate link 213 is one non-limiting example of a locking arrangement that may be employed to lock the complementing part 218 for an embodiment of the system 200.

The SMA actuator 212 is in some embodiments considered a part of a charge drain or relief sub-system. A function of the sub-system is to drain or alleviate unwanted charge in the system 200 and, particularly, for example, unwanted charge from the electrical component(s) 202. In some embodiments (not shown in detail in FIG. 2), the SMA actuator 212 is not a part of the charge drain or relief sub-system.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A device for supplying electric power to an actuator that employs a smart material, comprising:
   a rectifier, an adaptive voltage clamping circuit, and a DC-DC voltage regulator;
      the rectifier disposed to receive electric power indicated by an input voltage level, wherein the rectifier includes an output line that is electrically connected to an input line of the adaptive voltage clamping circuit,
      the adaptive voltage clamping circuit including a power transistor, a voltage feedback circuit, and a controller, wherein the voltage feedback circuit is arranged to monitor voltage level of the electric power supplied to the DC-DC voltage regulator, wherein the controller is disposed to monitor the voltage feedback circuit, and wherein the controller is disposed to control the power transistor,
      the DC-DC voltage regulator including an input line that is electrically connected to an output line of the adaptive voltage clamping circuit, and
      the DC-DC voltage regulator including an output line that is electrically connected to the smart material of the actuator;
   wherein the controller controls the power transistor to a fully ON state to transfer electric power between the rectifier and the DC-DC voltage regulator when the voltage feedback circuit indicates that the voltage level supplied to the DC-DC voltage regulator is less than a threshold voltage level; and
   wherein the controller controls the power transistor in a linear state to regulate the voltage level of the electric power that is transferred between the rectifier and the DC-DC voltage regulator when the voltage feedback circuit indicates that the voltage level supplied to the DC-DC voltage regulator is greater than the threshold voltage level.

2. The device of claim 1, wherein the electric power received by the rectifier comprises a single-phase AC electric power having a voltage level between 60 Vrms and 270 Vrms.

3. The device of claim 1, wherein the electric power received by the rectifier comprises a three-phase AC electric power having a voltage level between 45 Vrms and 750 Vrms.

4. The device of claim 1, wherein the electric power received by the rectifier comprises a DC electric power having a voltage level between 70 and 1000 Vdc.

5. The device of claim 1, wherein the DC-DC voltage regulator is configured to deliver electric power to the actuator at up to a 5 V DC voltage level at up to 2 amperes of current when the voltage level at the input line is less than 360 Vdc.

6. The device of claim 1, wherein the smart material employed by the actuator comprises a shape memory alloy.

7. The device of claim 1, wherein the controller controls the power transistor so as to gradually raise the voltage level of the electric power that is transferred between the rectifier and the DC-DC voltage regulator during an initial power-up operation of the device when a maximum voltage is present at the output of the rectifier.

8. A device for supplying regulated electric power, comprising:
   a rectifier, an adaptive voltage clamping circuit, and a DC-DC voltage regulator, including:
      the rectifier disposed to receive electric power indicated by an input voltage level, wherein the rectifier includes an output line that is electrically connected to an input line of the adaptive voltage clamping circuit,
      the adaptive voltage clamping circuit including a power transistor, a voltage feedback circuit, and a controller, wherein the voltage feedback circuit is arranged to monitor voltage level of the electric power supplied to the DC-DC voltage regulator, wherein the controller is disposed to monitor the voltage feedback circuit, and wherein the controller is disposed to control the power transistor,
      the DC-DC voltage regulator including an input line that is electrically connected to an output line of the adaptive voltage clamping circuit, and
      the DC-DC voltage regulator including an output line;
   wherein the input voltage level to the rectifier is a voltage level that ranges between 45 Vrms AC and 750 Vrms AC and a voltage level that ranges between 70 Vdc and 1000 Vdc;
   wherein the controller controls the power transistor to a fully ON state to transfer electric power between the rectifier and the DC-DC voltage regulator when the voltage feedback circuit indicates that the voltage level supplied to the DC-DC voltage regulator is less than a threshold voltage level; and
   wherein the controller controls the power transistor in a linear state to regulate the voltage level of the electric power that is transferred between the rectifier and the DC-DC voltage regulator when the voltage feedback circuit indicates that the voltage level supplied to the DC-DC voltage regulator is greater than the threshold voltage level.

9. The device of claim 8, wherein the output line of the DC-DC voltage regulator is electrically connected to an actuator.

10. The device of claim 9, wherein the actuator comprises a smart actuator.

11. The device of claim 10, wherein the smart actuator includes an element fabricated from a shape memory alloy.

12. The device of claim 8, wherein the DC-DC voltage regulator is configured to deliver electric power up to a 5 V DC voltage level at up to 2 amperes of current when the voltage level at the input line is less than 360 V DC.

13. The device of claim 8, wherein the controller controls the power transistor in a voltage level ramp-up state to control the voltage level of electric power transferred between the rectifier and the DC-DC voltage regulator during an initial power-up operation of the device when a maximum voltage is present at the output of the rectifier.

14. A system including a system component that is powered by electricity received from a power source, the system comprising:
an actuator selectively operative in one of a first position and a second position;
an electric power circuit implemented in the system component, the electric power circuit including a rectifier, an adaptive voltage clamping circuit, and a DC-DC voltage regulator; and
a latching system including a smart actuator operative to engage a receptacle;
wherein the system component is electrically connected to the power source when the actuator is in the first position,
wherein the system component is electrically disconnected from the power source when the actuator is in the second position,
wherein an output from the DC-DC voltage regulator is electrically connectable to the smart actuator of the latching system only when the actuator is in the second position;
wherein the smart actuator of the latching system is disengaged from the receptacle when the system component is connected to the power source; and
wherein the smart actuator of the latching system may be engaged with the receptacle when the system component is disconnected from the power source.

15. The system of claim 14, further comprising a cover plate mechanically coupled to the receptacle, and wherein the cover plate prevents access to the system component when the smart actuator of the latching system is engaged with the receptacle when the system component is disconnected from the power source.

16. The system of claim 14, wherein the electric power circuit comprises:
a rectifier, an adaptive voltage clamping circuit, and a DC-DC voltage regulator, wherein voltage output from the DC-DC voltage regulator is electrically connectable to the smart actuator of the latching system when the actuator is in the second position;
the rectifier disposed to receive electric power indicated by an input voltage level, wherein the rectifier includes an output line that is electrically connected to an input line of the adaptive voltage clamping circuit;
the adaptive voltage clamping circuit including a power transistor, a voltage feedback circuit, and a controller, wherein the voltage feedback circuit is arranged to monitor voltage level of the electric power supplied to the DC-DC voltage regulator, wherein the controller is disposed to monitor the voltage feedback circuit, and wherein the controller is disposed to control the power transistor;
the DC-DC voltage regulator including an input line that is electrically connected to an output line of the adaptive voltage clamping circuit;
the DC-DC voltage regulator including an output line that is electrically connected to the actuator for the smart material;
wherein the controller controls the power transistor to a fully ON state to transfer electric power between the rectifier and the DC-DC voltage regulator when the voltage feedback circuit indicates that the voltage level supplied to the DC-DC voltage regulator is less than a threshold voltage level; and
wherein the controller controls the power transistor in a linear state to regulate the voltage level of the electric power that is transferred between the rectifier and the DC-DC voltage regulator when the voltage feedback circuit indicates that the voltage level supplied to the DC-DC voltage regulator is greater than the threshold voltage level.

17. The system of claim 16, wherein the electric power received by the rectifier comprises a single-phase AC electric power having a voltage level between 60 Vrms and 270 Vrms.

18. The system of claim 16, wherein the electric power received by the rectifier comprises a three-phase AC electric power having a voltage level between 45 Vrms and 750 Vrms.

19. The system of claim 16, wherein the electric power received by the rectifier comprises a DC electric power having a voltage level between 70 and 1000 Vdc.

20. The system of claim 16, wherein the controller controls the power transistor in a voltage level ramp-up state to control the voltage level of electric power that is transferred between the rectifier and the DC-DC voltage regulator during an initial power-up operation of the device when a maximum voltage is present at the output of the rectifier.

* * * * *